COUPLING AND BRAKING APPARATUS FOR TRACTION MOTORS

Filed July 21, 1947 2 Sheets-Sheet 1

Inventor
Leon Heidmann
By E. F. Wenderoth
Attorney

Oct. 3, 1950 L. HEIDMANN 2,524,348

COUPLING AND BRAKING APPARATUS FOR TRACTION MOTORS

Filed July 21, 1947 2 Sheets-Sheet 2

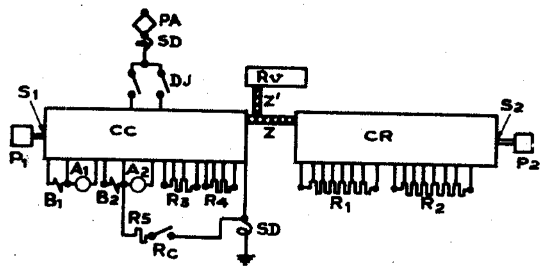

Fig. 3

| Positions | COUPLING CONTACTORS A | B | C | D | E | F | G | H | I | J | K | M | N | P | | SHUNTING CONT. Q | R | S | T | V | W |
|---|---|---|---|---|---|---|---|---|---|---|---|---|---|---|---|---|---|---|---|---|---|
| -6 | | | | | | | | | | | | o | o | o | | | | | | | o |
| -5 | | | o | | | | | | | | | o | o | o | | | | | | | o |
| -4 | o | o | o | | | | | | | o | o | o | o | o | | | | | | | o |
| -3 | o | o | o | | | | | | | o | o | o | o | | | | | | | | o |
| -2 | o | o | o | | | | | | | o | o | o | | | | | | | | | o |
| -1 | o | o | o | | | | | | | o | o | | | | | | | | | | |
| 0 | | | o | | | | | | | | | | | | | | | | | | |
| 1 | o | o | o | | | | o | o | o | | | | | | | | | | | | |
| 2 | o | o | o | o | | | o | o | o | | | | | | | o | | | o | | |
| 3 | o | o | | o | | | o | o | o | | | | | | | o | o | | o | o | |
| 4 | o | o | | o | | | o | o | o | | | | | | | | o | o | o | o | o |
| 5 | o | o | | o | o | o | o | o | o | | | | | | | | | o | o | | o |
| 6 | o | o | | | o | o | o | o | o | | | | | | | | | | | | |
| 7 | o | o | | | o | o | o | o | o | | | | | | | o | | | o | | |
| 8 | o | o | | | o | o | o | o | o | | | | | | | o | o | | o | o | |
| 9 | o | o | | | o | o | o | o | o | | | | | | | | o | o | o | o | o |

Fig. 4

| Pos. | RHÉOSTATIC CONTACTORS 1 | 3 | 5 | 7 | 9 | 11 | 13 | 15 | 2 | 4 | 6 | 8 | 10 | 12 | 14 | 16 |
|---|---|---|---|---|---|---|---|---|---|---|---|---|---|---|---|---|
| 0 | | | | | | | | | | | | | | | | |
| I | o | | | | | | | | | | | | | | | |
| II | o | | | | | | | | o | | | | | | | |
| III | o | o | | | | | | | o | | | | | | | |
| IV | | o | | | | | | | o | o | | | | | | |
| V | | o | o | | | | | | | o | | | | | | |
| VI | | | o | | | | | | | o | o | | | | | |
| VII | | | o | o | | | | | | | o | | | | | |
| VIII | | | | o | | | | | | | o | o | | | | |
| IX | | | | o | o | | | | | | | o | | | | |
| X | | | | | o | | | | | | | o | o | | | |
| XI | | | | | o | o | | | | | | | o | | | |
| XII | | | | | | o | | | | | | | o | o | | |
| XIII | | | | | | o | o | | | | | | | o | | |
| XIV | | | | | | | o | | | | | | | o | o | |
| XV | | | | | | | o | o | | | | | | | o | |
| XVI | | | | | | | | o | | | | | | | o | o |

Fig. 5

Inventor
Leon Heidmann
By E. F. Wenderoth
Attorney

Patented Oct. 3, 1950

2,524,348

UNITED STATES PATENT OFFICE 2,524,348

COUPLING AND BRAKING APPARATUS FOR TRACTION MOTORS

Leon Heidmann, Jeumont, France, assignor to Societe Anonyme dite: Forges et Ateliers de Constructions Electriques de Jeumont, Paris, France, a corporation of France Application July 21, 1947, Serial No. 762,431
In France April 19, 1944

Section 1, Public Law 690, August 8, 1946
Patent expires April 19, 1964

5 Claims. (Cl. 318—63)

This invention relates to an improved electrical traction equipment for direct current vehicles such as motor-coaches, comprising cam operated contactors.

One of the objects of the invention is to improve the control characteristics and to increase the number of control steps or notches with a relatively low number of contactors.

Another object of the invention is to obtain rapidly a reliable and stable braking operation at low currents and to increase the number of braking steps.

Still another object is to improve the safety features by a special arrangement of the circuit breaker.

Figure 1:
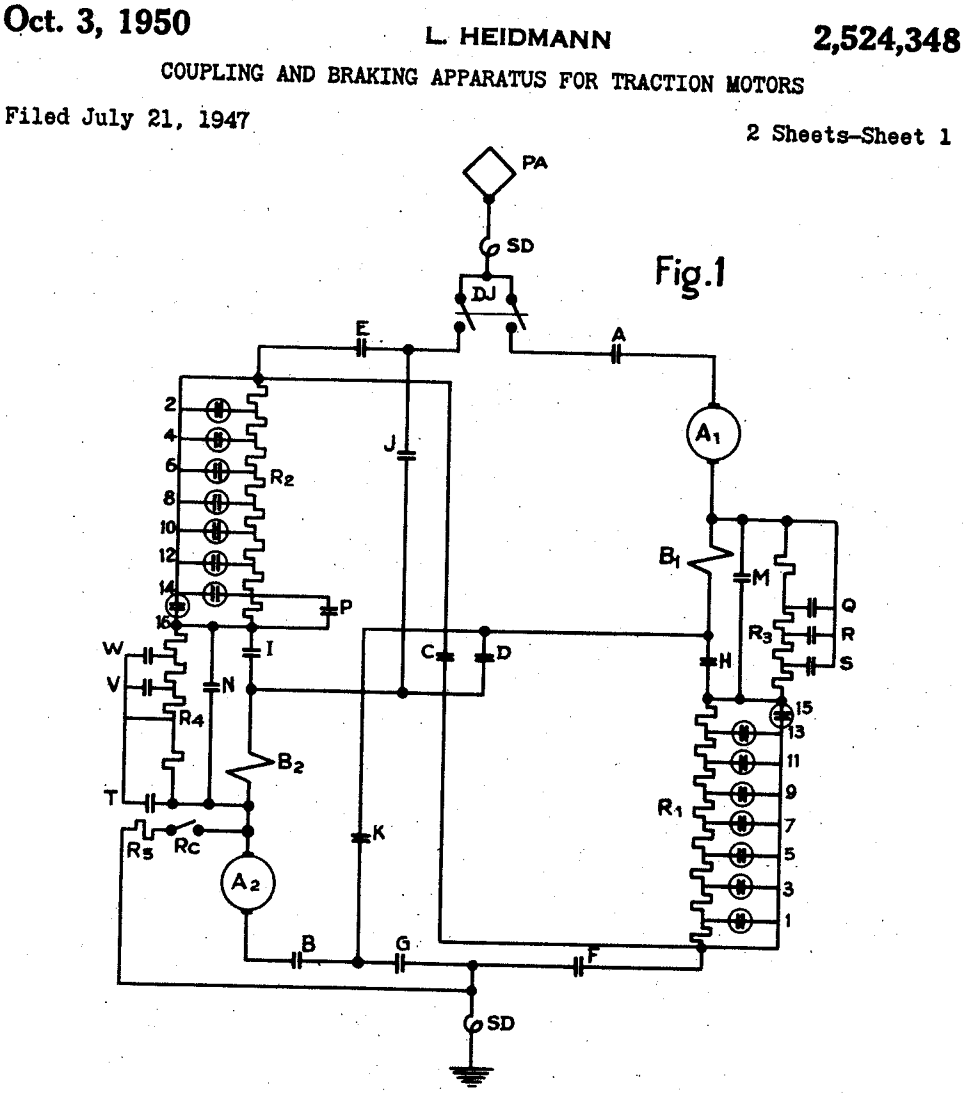
Figure 2:
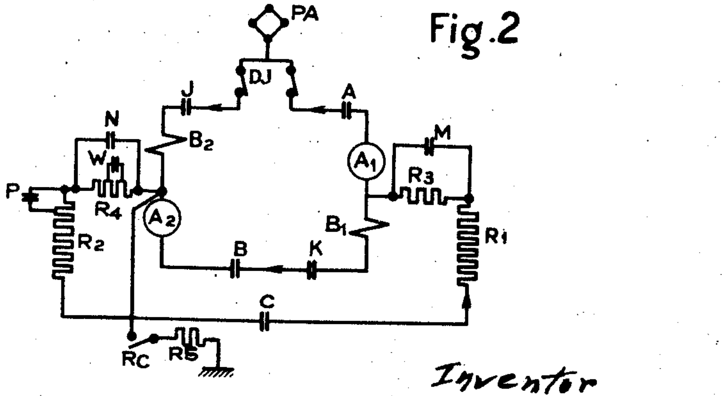

The above and other objects of the invention will appear from the detailed description given below and from the attached drawings in which Fig. 1 is a wiring diagram of an electrical equipment, Fig. 2 is a simplified diagram of the braking connections, Fig. 3 shows the general arrangement of the apparatus, Fig. 4 a chart illustrating the sequence of the coupling and shunting contactors and Fig. 5 a similar chart referring to the rheostatic contactors.

The invention will be described in the case of a two motor equipment provided for starting, shunting and rheostatic braking operations.

According to the invention, the new equipment presents essentially the following features which may be used separately or simultaneously:

(1) The general circuit lay-out is of the two branch type with the "bridge" transition and crossed braking connections.

(2) The contactors of the cam-operated type are grouped to form two separate cam-operated main controllers driven by appropriate auxiliary pilot motors operating step by step: a so called "coupling controller" and a so called "rheostatic controller," the various control operations being effected step by step by combined and conjugate movements of their respective cam-shafts.

(3) These conjugated movements are obtained by the action of corresponding control circuits and elements, such as master controller relays and interlocking devices.

(4) The shunting resistances are used to obtain the first braking notches.

(5) A special contactor, called the vernier contactor, is connected and controlled in such a way that the number of the braking notches is substantially increased.

(6) The traction motors can receive a complementary separate excitation during the braking operation, if the braking current is relatively low.

(7) The main circuit breaker is of the bipolar type acting upon the two branches of the wiring diagram and interrupting the motor circuits in traction as well as in braking operation.

(8) This circuit breaker is controlled by appropriate protective relays.

An embodiment of the above features is shown in Fig. 1 representing diagrammatically a pantograph PA, protective relays SD, a bipolar circuit breaker DJ, the motor armatures $A_1$ and $A_2$, the corresponding series inductor windings $B_1$ and $B_2$, the starting and braking rheostats $R_1$ and $R_2$, the shunting rheostats $R_3$ and $R_4$ (which are also used for braking purposes as it will be explained below), thirteen cam-operated contactors A, B, C, D, E, F, G, H, I, J, K, M, N, six cam-operated shunting contactors Q, R, S, T, V, W, one vernier contactor P and sixteen rheostatic contactors 1 to 16.

The rheostatic contactors 1 to 16 (shown in Fig. 1 as surrounded by circles) form a separate cam-operated unit—the rheostatic controller CR shown in Fig. 3. The thirteen coupling contactors A to N, the six shunting contactors Q to W and the vernier contactor P form another separate cam-operated unit—the coupling controller CC shown in Fig. 3.

There is an additional separate contactor RC connected in series with an additional resistor RS; it is provided for closing a separate excitation circuit for braking purposes, as it will be described later. As shown in Fig. 3 illustrating the general arrangement of the equipment each of the cam-operated controllers CC and CR comprises a cam-shaft $S_1$ or $S_2$ separately driven by a respective pilot motor $P_1$ or $P_2$, arranged for a step by step operation. The above controllers, as well as a suitable reverser $Rv$ are interconnected by cables Z and Z′ comprising the connections shown in Fig. 1.

The operation of the two above mentioned controllers CC and CR by their pilot motors, of the reverser $Rv$ and of the separate contactor RC is effected by control devices and circuits not shown, such as a master controller, appropriate relays etc. These control means which are not objects of the present invention, may be similar to those of the copending application Ser. No. 762,428 filed July 21, 1947. They are arranged to produce suitable combined and conjugate movements of the two controllers, such as follows:

During the starting operation, the coupling controller CC leaves the zero position and reaches the notch "1" in which according to Fig. 4 the series coupling of the motors $A_1$, $A_2$ is obtained by the closure of contactors A, B, C, G, H, I. The rheostatic controller CR then moves from the zero notch to successive notches I, II, III, etc. and by a progressive and alternate closure of the contactors 1 to 16, as shown in Fig. 5 the resistors $R_1$ and $R_2$ are eliminated step by step. In the last position XVI they are completely eliminated by the contactors 15 and 16.

The coupling controller CC which remained in its position "1" during the above resistance elimination, now restarts and passes to the positions "2," "3" and "4" in which the contactors Q to W produce the shunting notches by acting upon the inductors $B_1$ and $B_2$ as shown in Fig. 4.

After that the rheostatic controller CR making a further step reaches again its zero position in which all rheostatic contactors 1 to 16 are opened, and the coupling controller CC attains the notch "6" in which the coupling contactors A, B, E, F, G, H, I, produce the parallel coupling of motors $A_1$, $A_2$ by the bridge method. The coupling controller now stops in this position, and the rheostatic controller CR, restarting again in the same direction, eliminates again the resistors $R_1$ and $R_2$, after which the coupling controller CC effects the shunting connections in its positions "7," "8" and "9."

During the braking operation the combined movement of the two cam controllers is as follows: first, the coupling controller CC reaches its "−1" position in which, according to Fig. 4, the coupling contactors A, B, C, J, and K are closed. This produces the braking connections as shown in Fig. 2. It will be seen that in this figure the inductor $B_1$ is connected in series with the motor armature $A_2$ and that the inductor $B_2$ is in series with $A_1$, which corresponds to the well known crossed excitation braking diagram.

In this position "−1" the shunting resistors $R_3$ and $R_4$ are connected in series with the starting and braking resistors $R_1$ and $R_2$. In the next position "−2" the contactor M eliminates $R_3$ and the contactor W short-circuits a part of $R_4$; in the following position "−3" the closing of the contactor N completely eliminates $R_4$. The initial braking current is thus increased very gradually.

The coupling controller CC now stops in the position "−3" and the remaining resistors $R_1$ and $R_2$ are eliminated step by step by the action of the rheostatic controller CR which reaches for instance its position VII.

The next braking notches are obtained and their number is doubled by a combined action of both cam-controllers as follows. The vernier contactor P (Figs. 1 and 2) operated by the cam shaft of the coupling controller CC is adapted to short-circuit a small fraction of the rheostat $R_2$ (or a separate resistance connected in series with the braking circuit). It closes each time before the movement of the rheostatic controller CR to the positions VIII, IX, X etc., and it opens when each of these positions is reached.

There may be further positions "−5" and "−6" of the coupling controller CC in which the braking circuits are interrupted; these positions can be used for different purposes, for instance for operating in the desired directions the reverse $Rv$ by a suitable mechanical transmission interposed between $Rv$ and the controller CC, as stated in the above mentioned copending application Ser. No. 762,428.

In order to stabilize and to improve the braking operation at small currents as well as to accelerate the establishment of the braking action, an additional exciting circuit is used as shown in Figs. 1 and 2. The corresponding additional current is provided directly by the D. C. line to excite a part of the normal motor inductor coils, so that no special exciting coils nor power sources are required. The said additional current flows from PA through the contactor J, the inductor $B_2$, the separate contactor RC and the resistor $R_5$.

The contactor RC can be a part of the coupling controller CC; it also can be a separate magnetic type contactor, and in this latter case it is controlled by a relay responsive to the braking current, so that it is only closed at low values of this braking current.

As it has been stated above, the circuit breaker DJ is of the bipolar type. It is connected in such a way that when opening during the traction operation, it interrupts the line connections and both motor branches, effecting at the same time the separation of the motors. When opening during the braking operation (Fig. 2) it interrupts the additional excitation circuit and owing to the crossed excitation feature the two motors are simultaneously de-excited.

The tripping of the circuit breaker DJ can be controlled by one or by a plurality of differential or overload protective relays, the coils of which are shown at SD in Fig. 1. It will be seen that with such an arrangement the circuit breaker is responsive to:

(1) An accidental grounding of the motor circuits and resistances in traction and in braking;

(2) An overload of the motors in traction only.

It results therefrom that the circuit breaker secures the following safety features: a permanent protection against an accidental grounding; a protection against overloads in traction only with no action in braking); the circuits are always opened in such a way that the traction or braking operation of motors is immediately stopped; it is impossible for a motor to start delivering current to another motor if for instance the cam controllers are accidentally immobilized in a parallel connection.

I claim:

1. In a direct current electric vehicle with a circuit arrangement of the two branch type having in one branch a traction motor inserted at the ground end, and in the other branch a similar motor at the line end, a dual purpose starting and braking resistance connected in each branch in series with the respective motors, and a separate shunting resistance connected in parallel with the respective motor field, a starting, shunting and resistance braking equipment comprising a bipolar main circuit breaker, each pole of which is connected in series with one of said branches, a plurality of coupling contactors inserted between both said branches for producing the series-parallel motor connections by the conventional bridge method, and a plurality of coupling contactors for producing dynamic braking connections to the respective said starting and braking resistances, two similar groups of shunting contactors connected across the said shunting resistances, adapted for controlling both motor fields and connected to control said shunting resistances, and two similar groups of rheostatic contactors connected for short-circuiting respectively both said starting and braking resistances, all said coupling and shunting contactors being grouped to form a coupling controller arranged for effecting the motor connections and the field control, all said rheostatic contactors being grouped to form a separate rheostatic controller, the said two controllers being arranged to effect independent and combined movements.

2. In a direct current electric vehicle with a circuit arrangement of the two branch type having in one branch a traction motor inserted at the ground end, and in the other branch a similar motor at the line end, a dual purpose starting and braking resistance connected in each branch in series with the respective motors, and a separate shunting resistance connected in parallel with the respective motor field, a starting, shunting and resistance braking equipment comprising a bipolar main circuit breaker, each pole of which is connected in series with one of said branches, a plurality of coupling contactors inserted between both said branches for producing the series-parallel motor connections by the conventional bridge method, and a plurality of coupling contactors for producing dynamic braking connections to the respective said starting and braking resistances, two similar groups of shunting contactors connected across the said shunting resistances, adapted for controlling both motor fields and connected to control said shunting resistances, and two similar groups of rheostatic contactors connected for short-circuiting respectively both said starting and braking resistances, all said coupling and shunting contactors being grouped to form a coupling controller arranged for effecting the motor connections and the field control, all said rheostatic contactors being grouped to form a separate rheostatic controller, the said two controllers being arranged to effect independent and combined movements, the said coupling controller being arranged to close at the first braking notch the coupling and shunting contactors which are connected to insert all said starting and shunting resistances in a rheostatic braking circuit of the conventional crossed field type.

3. In a direct current electric vehicle as claimed in claim 2, means for increasing the number of braking notches, comprising an additional vernier contactor forming a part of said coupling controller and connected for short-circuiting a small section of one of said starting and braking resistances and adapted to be closed periodically by alternate movements of said coupling controller before a plurality of braking notches corresponding to step-by-step movements of said rheostatic controller.

4. In a direct current electric vehicle as claimed in claim 2, a circuit for stabilizing and improving the braking effort at low braking currents comprising an additional braking contactor and an additional resistance connected in series between the ground and one terminal of the motor field of the said ground-side motor, the other terminal of said motor field being connected to the line by a coupling contactor.

5. In a direct current electric vehicle as claimed in claim 4, the said additional braking contactor being connected to be excited by a current responsive relay to close at low braking currents only.

LEON HEIDMANN.

REFERENCES CITED

The following references are of record in the file of this patent:

UNITED STATES PATENTS

| Number | Name | Date |
|---|---|---|
| 1,246,425 | Hellmund | Nov. 13, 1917 |
| 1,264,941 | Jones et al. | May 7, 1918 |
| 1,291,583 | Mardis et al. | Jan. 14, 1919 |
| 2,066,920 | Willby et al. | Jan. 5, 1937 |